United States Patent
Sada et al.

(10) Patent No.: US 10,355,509 B2
(45) Date of Patent: Jul. 16, 2019

(54) MANAGEMENT APPARATUS, CHARGE AND DISCHARGE CONTROL APPARATUS, POWER STORAGE SYSTEM, AND CHARGE AND DISCHARGE CONTROL METHOD

(71) Applicant: Panasonic Intellectual Property Management Co., Ltd., Osaka (JP)

(72) Inventors: Tomokazu Sada, Osaka (JP); Kouichi Masuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 211 days.

(21) Appl. No.: 15/525,646

(22) PCT Filed: Jul. 27, 2016

(86) PCT No.: PCT/JP2016/003469
§ 371 (c)(1),
(2) Date: May 10, 2017

(87) PCT Pub. No.: WO2017/033399
PCT Pub. Date: Mar. 2, 2017

(65) Prior Publication Data
US 2017/0338668 A1 Nov. 23, 2017

(30) Foreign Application Priority Data

Aug. 21, 2015 (JP) ................................. 2015-164003

(51) Int. Cl.
*H01M 10/46* (2006.01)
*H02J 7/00* (2006.01)
(Continued)

(52) U.S. Cl.
CPC ............. *H02J 7/007* (2013.01); *H01M 10/44* (2013.01); *H01M 10/443* (2013.01);
(Continued)

(58) Field of Classification Search
CPC ............. H02J 7/1446; H02J 7/04; H02J 7/047
(Continued)

(56) References Cited

U.S. PATENT DOCUMENTS

2012/0200257 A1\* 8/2012 Schwarz ............... H01M 10/42
320/109

FOREIGN PATENT DOCUMENTS

JP  2000-030753  1/2000
JP  2011-188544  9/2011
(Continued)

OTHER PUBLICATIONS

International Search Report of PCT application No. PCT/JP2016/003469 dated Sep. 27, 2016.

*Primary Examiner* — Edward Tso
(74) *Attorney, Agent, or Firm* — McDermott Will & Emery LLP (57) ABSTRACT

A controller issues an instruction of charge and discharge control to charge a power storage device up to a first target SOC and to discharge the power storage device up to a second target SOC. The controller lowers the first target SOC and the second target SOC with an increase in predicted temperature of the power storage device in a next charge and discharge cycle. The controller lowers the first target SOC and the second target SOC such that the second target SOC is lower than the first target SOC.

8 Claims, 6 Drawing Sheets

(51) Int. Cl.
  *H01M 10/44*  (2006.01)
  *H02J 3/32*  (2006.01)
  *H02J 7/04*  (2006.01)
  *H01M 10/48*  (2006.01)
  *H02J 3/00*  (2006.01)
(52) U.S. Cl.
  CPC .............. *H01M 10/486* (2013.01); *H02J 3/32* (2013.01); *H02J 7/0068* (2013.01); *H02J 7/04* (2013.01); *H02J 7/047* (2013.01); *H02J 2003/003* (2013.01); *H02J 2007/005* (2013.01)
(58) Field of Classification Search
  USPC .......................... 320/132, 134, 136, 149, 150
  See application file for complete search history.

(56) References Cited

FOREIGN PATENT DOCUMENTS

| | | |
|---|---|---|
| JP | 2014-165966 | 9/2014 |
| WO | 2014/103218 | 7/2014 |

* cited by examiner

MANAGEMENT APPARATUS, CHARGE AND DISCHARGE CONTROL APPARATUS, POWER STORAGE SYSTEM, AND CHARGE AND DISCHARGE CONTROL METHOD

This application is a U.S. national stage application of the PCT International Application No. PCT/JP2016/003469 filed on Jul. 27, 2016, which claims the benefit of foreign priority of Japanese patent application 2015-164003 filed on Aug. 21, 2015, the contents all of which are incorporated herein by reference.

TECHNICAL FIELD

The present disclosure relates to a management apparatus that manages a power storage device; a charge and discharge control apparatus; a power storage system; and a charge and discharge control method.

BACKGROUND ART

To meet power demands varying depending on time periods, peak shaving or peak shift has been implemented to charge a storage battery in a time period with lower power demands and to discharge the storage battery in a time period with higher power demands. A storage battery undergoes cycle degradation and storage degradation. Cycle degradation refers to a phenomenon in which a battery capacity decreases due to repeated charge and discharge. Storage degradation refers to a phenomenon in which a battery capacity decreases with a lapse of time regardless of whether a battery is used. Both the cycle degradation and the storage degradation are caused by an irreversible chemical reaction in the storage battery.

In a storage battery of which the state of charge (SOC) is higher, storage degradation progresses increasingly. In a storage battery of which the temperature is higher, storage degradation also progresses increasingly since the high temperature facilitates a chemical reaction in the storage battery. Hence, it has been considered to lower a charge-target SOC of a storage battery of which the temperature is high (see Patent Literature 1, for example).

CITATION LIST

Patent Literature

PTL1: Japanese Laid-Open Patent Publication No. 2000-030753

SUMMARY OF THE INVENTION

Technical Problem

To use a storage battery for peak shaving or peak shift, the storage battery is charged in advance in accordance with an amount of power to be discharged in a next peak time period. Power is defined by a product of voltage and current. Therefore, an amount of current in cases of a low SOC (i.e., low battery voltage) becomes larger than an amount of current in cases of a high SOC (i.e., high battery voltage) even in supplying the same amount of power. An increase in amount of current accelerates charge and discharge cycles, which results in progression of cycle degradation.

The present disclosure is developed for the purpose of solving such requirements. One non-limiting and explanatory embodiment provides a technique for ensuring a required amount of power to be supplied in discharging a power storage device and reducing degradation in the power storage device.

Solutions to Problem

To solve the above-mentioned requirements, a management apparatus according to a first aspect of the present disclosure includes a controller that issues an instruction of charge and discharge control to charge a power storage device up to a first target state of charge (SOC) and to discharge the power storage device up to a second target SOC. The controller lowers the first target SOC and the second target SOC with an increase in predicted temperature of the power storage device in a next charge and discharge cycle.

Another aspect of the present disclosure provides a charge and discharge control method. This method is a charge and discharge control method for a power storage device, the charge and discharge control method including: repeating charge and discharge control to charge the power storage device up to a predetermined first SOC and to discharge the power storage device up to a predetermined second SOC; and controlling the power storage device such that the power storage device lowers the first SOC and the second SOC with an increase in predicted temperature of the power storage device.

Any desired combinations of the above described configuration elements, as well as converted expressions of the present disclosure among a method, an apparatus, a system, and other forms are also effective as other aspects of the present disclosure.

Advantageous Effect of Invention

One non-limiting and explanatory embodiment of the present disclosure ensures a required amount of power to be supplied in discharging a power storage device and reduces degradation in the power storage device.

DESCRIPTION OF EMBODIMENTS

Figure 1:
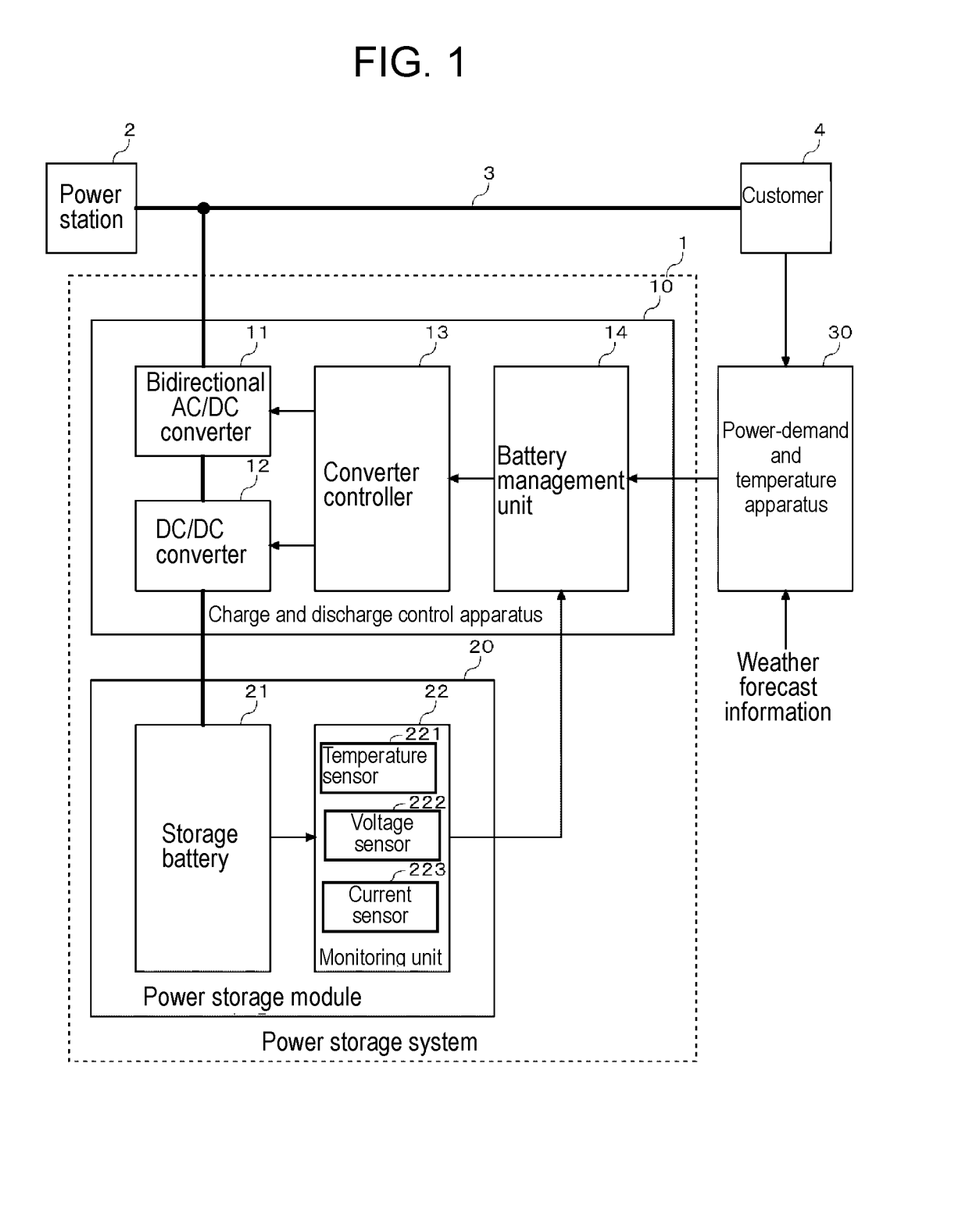
FIG. 1 illustrates a power storage system according to an exemplary embodiment of the present disclosure.

FIG. 1 illustrates power storage system 1 according to an exemplary embodiment of the present disclosure. Power storage system 1 is connected to system line 3 for feeding power from power station 2 to customer 4. Power storage system 1 includes charge and discharge control apparatus 10 and power storage module 20.

Power storage module 20 includes storage battery 21 and monitoring unit 22. Storage battery 21 may include, for example, lithium ion battery cells, nickel hydride battery cells, or lead-acid battery cells. A series connection of multiple battery cells leads to an increase in voltage of storage battery 21, whereas a parallel connection of multiple battery cells leads to an increase in capacity of storage battery 21. The following description is based on the assumption that storage battery 21 is constituted of lithium ion battery cells connected in series and in parallel.

Monitoring unit 22 monitors a state of storage battery 21 and sends monitoring data to battery management unit 14 of charge and discharge control apparatus 10 via a communication line. Monitoring unit 22 includes temperature sensor 221, voltage sensor 222, and current sensor 223. Temperature sensor 221 detects a temperature of storage battery 21. For example, a thermistor is disposed inside a stack for housing the battery cells of storage battery 21. Temperature sensor 221 estimates a temperature of storage battery 21 from a voltage across the thermistor or a current flowing through the thermistor.

Voltage sensor 222 detects a voltage of each battery cell and a total voltage of storage battery 21. Current sensor 223 detects a current flowing through each current path of storage battery 21 and a total current flowing through storage battery 21. For example, a Hall element or a shunt resistor is connected to each current path. Current sensor 223 detects a current flowing through each current path, based on an output voltage from the Hall element or a voltage across the shunt resistor. The total current flowing through storage battery 21 may be directly detected from a current at the confluence of the current paths or may be obtained by addition of detected currents at the respective current paths.

Monitoring unit 22 sends monitoring data indicating the detected temperature, voltage, and current to battery management unit 14 on a regular basis. In response to a request to acquire monitoring data from battery management unit 14, monitoring unit 22 immediately sends the monitoring data to battery management unit 14.

Charge and discharge control apparatus 10 includes bidirectional alternating current-to-direct current (AC/DC) converter 11, direct current-to-direct current (DC/DC) converter 12, converter controller 13, and battery management unit 14. In charging storage battery 21, bidirectional AC/DC converter 11 converts AC power received through system line 3 into DC power to supply the DC power to storage battery 21. In discharging storage battery 21, bidirectional AC/DC converter 11 converts DC power received from storage battery 21 into AC power to supply the AC power to system line 3. DC/DC converter 12 is connected between storage battery 21 and bidirectional AC/DC converter 11. In charging storage battery 21, DC/DC converter 12 increases a battery voltage to a system line voltage. In discharging storage battery 21, DC/DC converter 12 decreases the system line voltage to the battery voltage.

Bidirectional AC/DC converter 11 includes, for example, an inverter circuit and a filter circuit. The inverter circuit is constituted of four bridge-connected switching elements (e.g., insulated gate bipolar transistors, metal-oxide-semiconductor field-effect transistors). In cases of a three-phase alternating current circuit, the inverter circuit is constituted of six bridge-connected switching elements. The filter circuit includes an inductor and a capacitor. In discharging storage battery 21, the filter circuit shapes, into an approximately sine wave, waveforms of an AC voltage and AC current output from the inverter circuit. Converter controller 13 controls the inverter circuit of bidirectional AC/DC converter 11. Specifically, converter controller 13 gives a drive signal to a gate terminal of each switching element constituting the inverter circuit to control a duty ratio for each switching element.

In discharging storage battery 21, converter controller 13 adjusts a phase of an AC current to be output to system line 3, in accordance with a preset power factor angle. Converter controller 13 monitors at least one of an input-side current, an input-side voltage, an output-side current, and an output-side voltage of bidirectional AC/DC converter 11 to control a duty ratio for each switching element such that detected values of a current and/or voltage to be controlled become equal to target values of the current and/or voltage to be controlled.

DC/DC converter 12 is constituted of, for example, an insulated DC/DC converter or a bidirectional chopper. Converter controller 13 gives a drive signal to a gate terminal of each switching element in DC/DC converter 12 to control a duty ratio for each switching element. Converter controller 13 monitors an output-side current and an output-side voltage of DC/DC converter 12 to control a duty ratio for each switching element such that detected values of the output-side current and/or output-side voltage become equal to target values of the output-side current and/or output-side voltage.

Converter controller 13 acquires a charge rate or a discharge rate from battery management unit 14 and determines a target value of an output current from DC/DC converter 12, in accordance with the acquired charge rate or discharge rate. Note that bidirectional AC/DC converter 11 may be configured to directly control charge and discharge without providing DC/DC converter 12. In this case, converter controller 13 determines a target value of an output current from bidirectional AC/DC converter 11, in accordance with the charge rate or discharge rate acquired from battery management unit 14. As long as storage battery 21 can be charged or discharged up to a target SOC, either or both of bidirectional AC/DC converter 11 and DC/DC converter 12 is or are not always required, and any configuration may be applied.

As illustrated in FIG. 1, in cases that groups each consisting of battery cells connected in series are connected in parallel, a configuration in which DC/DC converter 12 is interposed between bidirectional AC/DC converter 11 and storage battery 21 allows charge and discharge control for each group, by disposing DC/DC converter 12 for each group.

Figure 2:
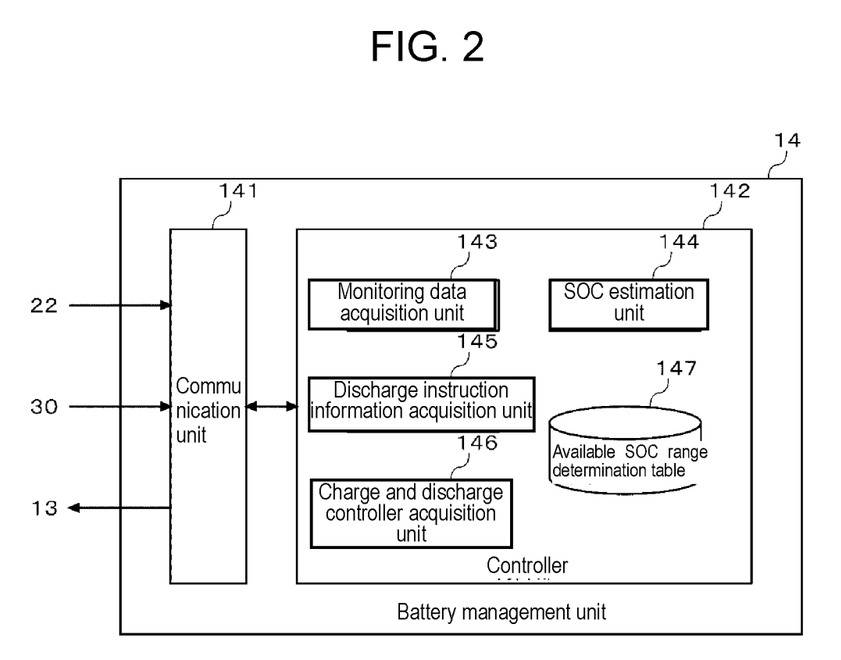
FIG. 2 illustrates a configuration of a battery management unit in FIG. 1.

FIG. 2 illustrates a configuration of battery management unit 14 in FIG. 1. Battery management unit 14 manages a state of storage battery 21 and controls charging to and discharging from storage battery 21. Battery management unit 14 includes communication unit 141 and controller 142. Controller 142 includes monitoring data acquisition unit 143, SOC estimation unit 144, discharge instruction information acquisition unit 145, charge and discharge controller 146, and available SOC range determination table 147. A configuration of controller 142 can be achieved through a hardware resource and a software resource cooperated each other, or a hardware resource only. Available hardware resources include a microcomputer, a digital signal processor, a read-only memory, a random access memory, a field-programmable gate array, and other large-scale integrated circuits. Available software resources include a program such as firmware.

Communications between battery management unit 14 and monitoring unit 22 and communications between battery management unit 14 and converter controller 13 are established in conformity with predetermined serial communication standards. Battery management unit 14 and power-demand and temperature apparatus 30 are coupled through the Internet or a special line. Communication unit 141 processes communications in accordance with a communication destination.

Monitoring data acquisition unit 143 acquires a temperature, voltage, and current of storage battery 21 from monitoring unit 22. SOC estimation unit 144 estimates an SOC of storage battery 21. SOC estimation unit 144 estimates an SOC by means of, for example, an open circuit voltage (OCV) method or a current integration method. The OCV method is a method for measuring an OCV of storage battery 21 with storage battery 21 neither charged nor discharged, and estimating an SOC in accordance with the OCV. Since an OCV and an SOC have a stable relationship, an SOC can be estimated from an OCV. The current integration method is a method for estimating an SOC by integrating a value of a current flowing into storage battery 21. The current integration method involves estimating an SOC fluctuated through charging and discharging, based on a ratio of a current integration value to a full charge capacity of storage battery 21, and adding the estimated SOC to an SOC before the charging and discharging, thereby estimating a present SOC.

Discharge instruction information acquisition unit 145 acquires discharge instruction information from power-demand and temperature prediction apparatus 30. The discharge instruction information includes a tomorrow's amount of power to be discharged, a tomorrow's time period of discharge, and a tomorrow's predicted temperature each regarding storage battery 21. The predicted temperature may be, for example, a tomorrow's predicted average air temperature. Charge and discharge controller 146 creates a tomorrow's charge and discharge plan for storage battery 21, based on the tomorrow's amount of power to be discharged and the tomorrow's time period of discharge. Specifically, charge and discharge controller 146 refers to available SOC range determination table 147, based on, as a key, a combination of the tomorrow's amount of power to be discharged and the tomorrow's predicted temperature each acquired from discharge instruction information acquisition unit 145 to determine a tomorrow's available SOC range of storage battery 21. An upper limit of the available SOC range is regarded as a charge-target SOC, whereas a lower limit of the available SOC range is regarded as a discharge-target SOC.

Charge and discharge controller 146 creates a charge plan, based on the specified charge-target SOC, a tomorrow's discharge start time, and the present SOC of storage battery 21, creates a discharge plan, based on the tomorrow's discharge start time and a tomorrow's discharge end time, and creates a tomorrow's (single day) charge and discharge plan (charge and discharge pattern). Charge and discharge controller 146 notifies converter controller 13 of a charge instruction or a discharge instruction in accordance with the created charge and discharge pattern.

Power-demand and temperature prediction apparatus 30 predicts a tomorrow's temperature and a tomorrow's demand of power to be consumed by a load in customer 4. Power-demand and temperature prediction apparatus 30 is managed and operated by, for example, an operator of an energy management system. Power-demand and temperature prediction apparatus 30 accesses a server (not illustrated) from which weather forecast information is provided to acquire a tomorrow's predicted average air temperature in a region where storage battery 21 is disposed. Power-demand and temperature prediction apparatus 30 also inputs parameters including power use history in customer 4, tomorrow's weather information, and tomorrow's event data into a demand prediction algorithm to predict tomorrow's power demand. This specification does not focus on a content of the demand prediction algorithm. Any existing demand prediction algorithm may be used herein.

Power-demand and temperature prediction apparatus 30 determines an amount of power to be discharged from storage battery 21 and supplied to system line 3 and a time period of discharge, based on a time transition of the predicted tomorrow's power demand and a target value of peak power to be generated in power station 1. Power-demand and temperature prediction apparatus 30 notifies, in a previous day, battery management unit 14 of discharge instruction information including the determined tomorrow's amount of power to be discharged and the determined tomorrow's time period of discharge.

Figure 3:
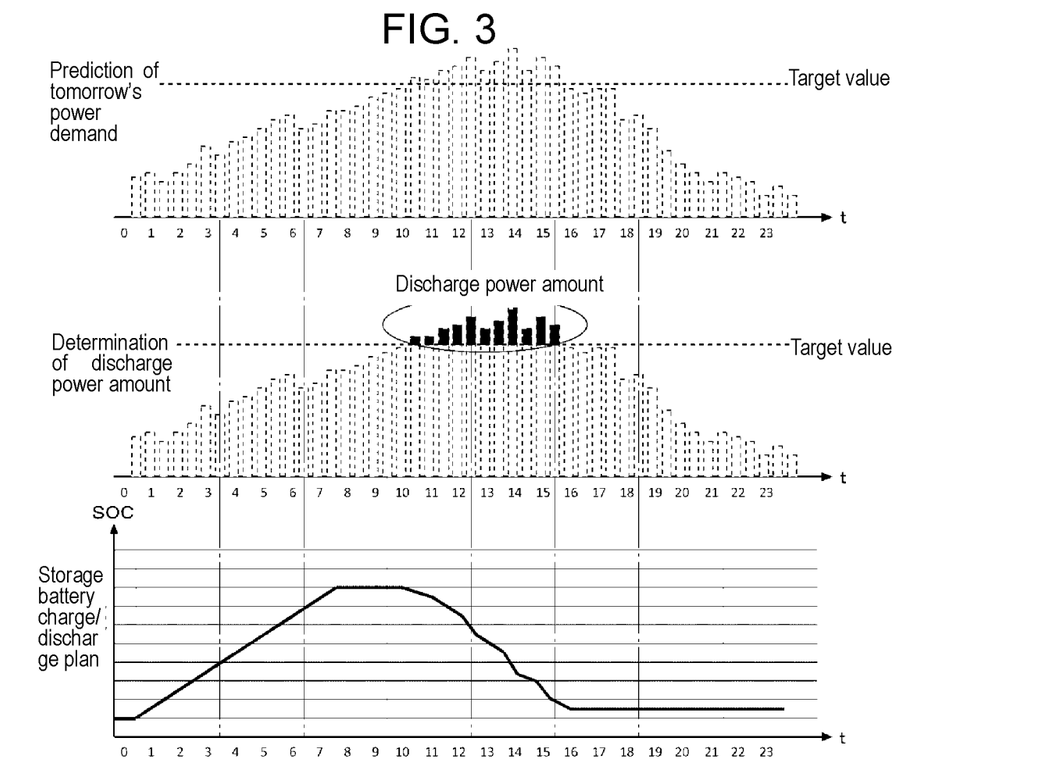
FIG. 3 illustrates examples a time transition of tomorrow's power demand, a tomorrow's amount of power to be discharged from a storage battery, and a tomorrow's charge and discharge plan for the storage battery.

FIG. 3 illustrates examples of a time transition of tomorrow's power demand, a tomorrow's amount of power to be discharged from storage battery 21, and a tomorrow's charge and discharge plan for storage battery 21. Power-demand and temperature prediction apparatus 30 predicts a time transition of tomorrow's power demand and applies a target value of peak power to be generated in power station 2, to the predicted time transition of power demand. As illustrated in FIG. 3, in a tomorrow's time period from 10:00 to 15:59, power demand exceeds the target value. Power-demand and temperature prediction apparatus 30 calculates, for the time period, an integration value of amounts of power exceeding the target value and determines an amount of power to be discharged from storage battery 21. Power-demand and temperature prediction apparatus 30 notifies battery management unit 14 of the determined amount of power to be discharged and a time period of discharge from storage battery 21 to system line 3.

Figure 4:
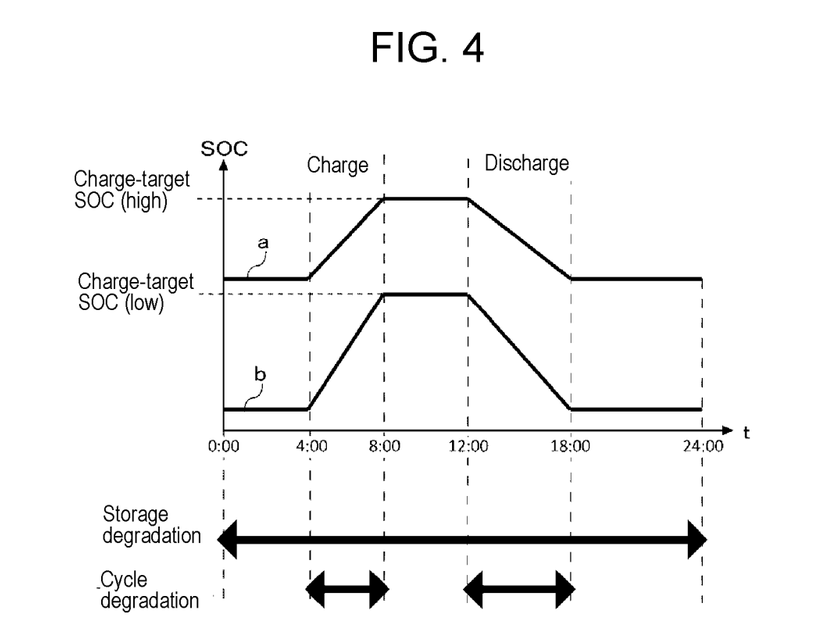
FIG. 4 illustrates examples of charge and discharge patterns for the storage battery.

FIG. 4 illustrates examples of charge and discharge patterns for storage battery 21. Specifically, FIG. 4 illustrates two charge and discharge patterns a, b through which an identical amount of power is discharged to system line 3. Charge and discharge patterns a, b illustrated in FIG. 4 are patterns where charging starts at 4:00 and ends at 8:00, while discharging starts at 12:00 and ends at 18:00. By comparing charge and discharge pattern a with charge and discharge pattern b, a charge-target SOC and a discharge-target SOC in charge and discharge pattern a are both higher than a charge-target SOC and a discharge-target SOC in charge and discharge pattern b. In other words, in charge and discharge pattern a, a relatively higher SOC range is specified as an available SOC range. Charge and discharge patterns may include, in addition to charge and discharge patterns a, b where charging and discharging continue successively, a pattern where, for example, charging starts at 4:00 and, with two suspension periods interposed, ends at 10:00, and discharging starts at 12:00 and ends at 18:00.

Since an SOC over charge and discharge pattern a is higher than an SOC over charge and discharge pattern b, storage degradation becomes significant in charge and discharge pattern a. On the other hand, since a battery voltage over charge and discharge pattern b is lower than a battery voltage over charge and discharge pattern a, charge and discharge current amounts required for charge and discharge of identical power become greater. Cycle degradation therefore becomes significant normally in charge and discharge pattern b. When storage battery 21 is operated in such a higher SOC range, the cycle degradation becomes negligible, but the storage degradation becomes significant. On the other hand, when storage battery 21 is operated in a lower SOC range, the storage degradation becomes negligible, but the cycle degradation becomes significant. As described above, the storage degradation and the cycle degradation are normally in a trade-off relationship. In the following description, a method is considered for minimizing a total degree of the storage degradation and cycle degradation, by determining an optimum operation point in an available SOC range (charge-target SOC and discharge-target SOC). This exemplary embodiment takes a temperature of storage battery 21 into account for determining an optimum operation point in an available SOC range.

Figure 5:
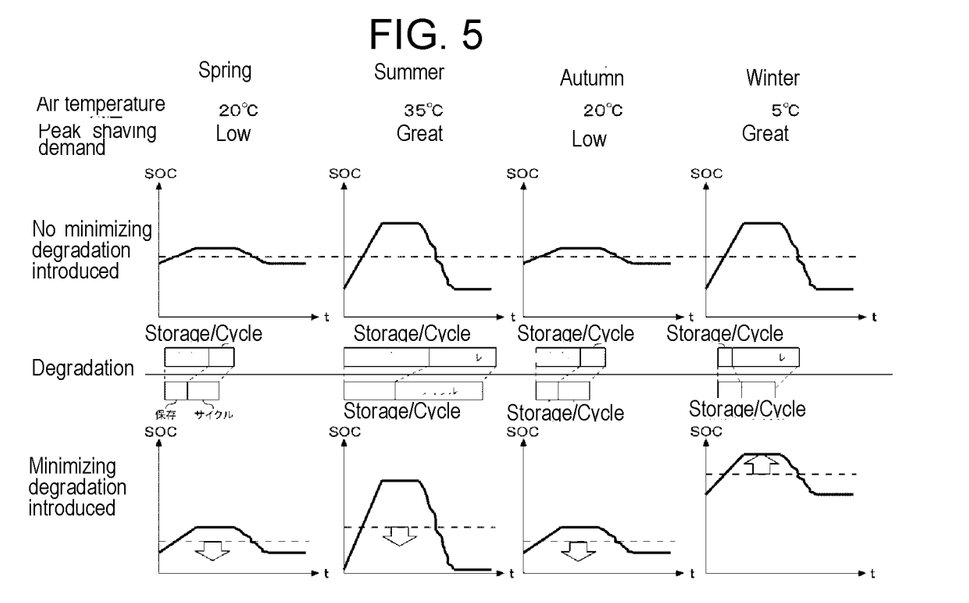
FIG. 5 illustrates a method for determining an available SOC range for the storage battery, based on a temperature.

FIG. 5 illustrates a method for determining an available SOC range for storage battery 21, based on a temperature. Specifically, FIG. 5 illustrates typical charge and discharge patterns in spring, summer, autumn, and winter. In summer and winter, for example, due to increased cooling demand or heating demand, peak shaving demand increases, and thus charge and discharge current amounts for storage battery 21 increases. Charge and discharge patterns illustrated on an upper side are examples where an SOC center value for charge and discharge is fixed (50% in FIG. 5). Charge and discharge patterns illustrated on a lower side are examples where a mechanism is introduced for minimizing a total degree of degradation in storage battery 21 by altering an operation point in an available SOC range in accordance with a temperature.

In spring and autumn, cooling demand and heating demand are low, and thus peak shaving demand is low. Charge and discharge current amounts for storage battery 21 are therefore small, and a degree of cycle degradation is small as well. Accordingly, storage degradation is reduced by lowering an available SOC range. As described above, storage degradation is reduced as a temperature is lower. As illustrated in FIG. 5, although lowering an available SOC range causes an increase in charge and discharge current amounts and an increase in degree of cycle degradation, lowering an SOC leads to a decrease in degree of storage degradation. Since an effect of decreasing a degree of storage degradation is higher than an effect of increasing a degree of cycle degradation, lowering an available SOC range is effective at decreasing a total degree of degradation.

In summer, an air temperature is higher, cooling demand and peak shaving demand are thus greater. Since an influence of storage degradation due to an air temperature rise is greater, storage degradation is reduced by lowering an available SOC range. As illustrated in FIG. 5, although lowering an available SOC range causes an increase in charge and discharge current amounts and an increase in degree of cycle degradation, lowering an SOC leads to a decrease in degree of storage degradation. Since an effect of decreasing a degree of storage degradation is higher than an effect of increasing a degree of cycle degradation, lowering an available SOC range is effective at decreasing a total degree of degradation.

In winter, an air temperature is lower, and thus heating demand and peak shaving demand are greater. Since a degree of storage degradation decreases remarkably because of a lower air temperature, cycle degradation is reduced by raising an available SOC range so as to decrease charge and discharge current amounts. As illustrated in FIG. 5, raising an available SOC range causes an increase in degree of storage degradation, but leads to a decrease in charge and discharge current amounts and a decrease in degree of cycle degradation. Since an effect of decreasing a degree of cycle degradation is higher than an effect of increasing a degree of storage degradation, raising an available SOC range is effective at decreasing a total degree of degradation.

Through experiments and simulations based on the above knowledge, designers derive an operation point in an available SOC range, at which a total degree of degradation in storage battery 21 becomes minimum, for each combination of a temperature of storage battery 21 and an amount of power to be discharged from storage battery 21. A derived operation point in an available SOC range for each combination of a temperature of storage battery 21 and an amount of power to be discharged from storage battery 21 is written in available SOC range determination table 147. Charge and discharge controller 146 can therefore determine an optimum operation point in an available SOC range by referring to available SOC range determination table 147, based on, as a key, a combination of a tomorrow's predicted temperature and a tomorrow's predicted amount of power to be discharged.

Figure 6:
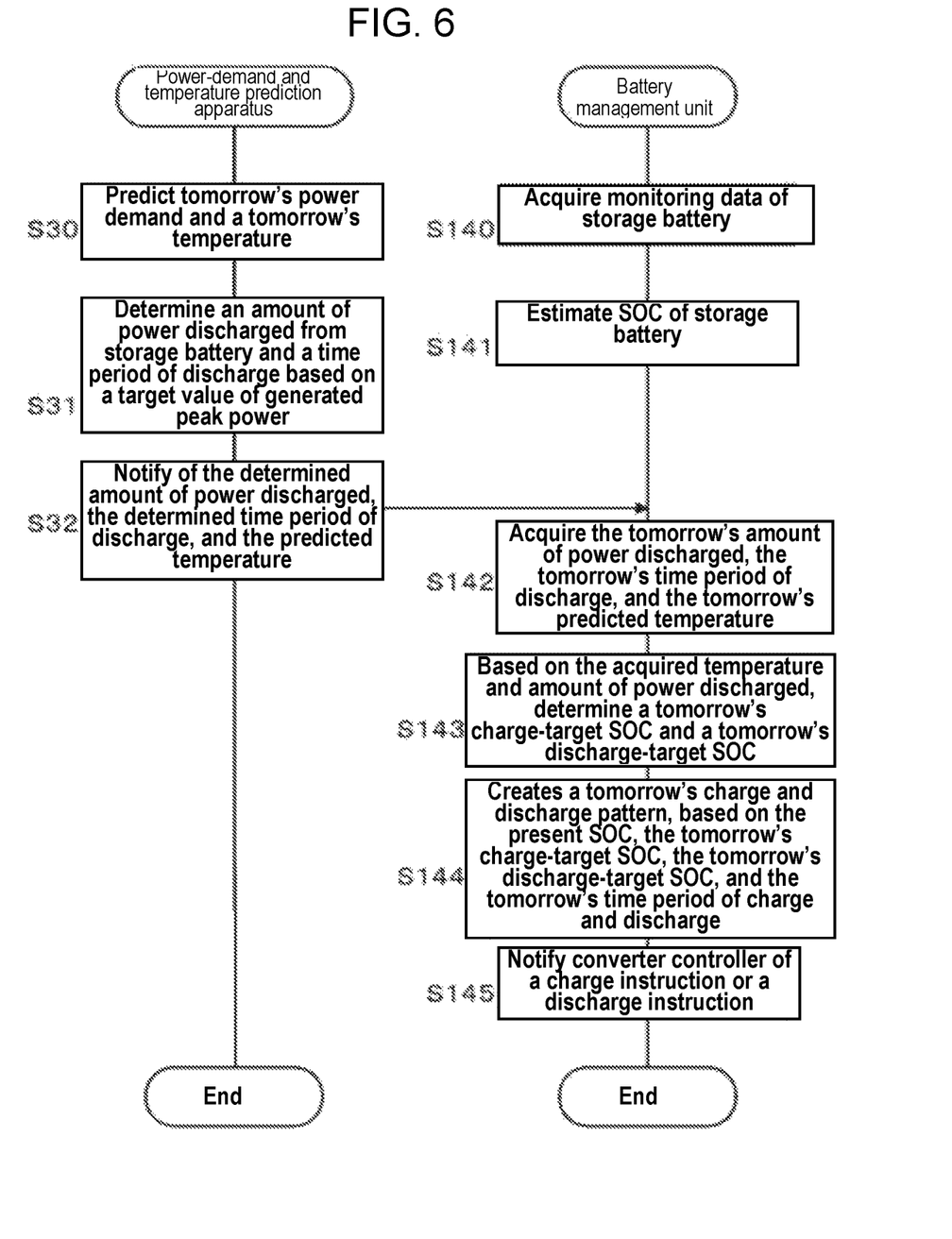
FIG. 6 is a flowchart of operations of a power-demand and temperature prediction apparatus and battery management unit according to the exemplary embodiment of the present disclosure.

FIG. 6 is a flowchart of operations of power-demand and temperature prediction apparatus 30 and battery management unit 14 according to the exemplary embodiment of the present disclosure. Power-demand and temperature prediction apparatus 30 predicts tomorrow's power demand and a tomorrow's temperature (S30). Power-demand and temperature prediction apparatus 30 applies, to a predicted time transition of power demand, a target value of peak power to be generated in power station 2 to determine an amount of power to be discharged from storage battery 21 and a time period of discharge (S31). Power-demand and temperature prediction apparatus 30 notifies battery management unit 14 of the determined amount of power to be discharged, the determined time period of discharge, and the predicted temperature (S32).

Monitoring data acquisition unit 143 of battery management unit 14 acquires monitoring data of storage battery 21 from monitoring unit 22 on a regular basis (S140). SOC estimation unit 144 estimates, based on a voltage and/or a current included in the acquired monitoring data, an SOC of storage battery 21 (S141). As long as an SOC can be estimated, a voltage and a current should not always be monitored. Discharge instruction information acquisition unit 145 acquires, from power-demand and temperature prediction apparatus 30, the tomorrow's amount of power to be discharged, the tomorrow's time period of discharge, and the tomorrow's predicted temperature (S142).

Charge and discharge controller 146 refers to available SOC range determination table 147, based on the acquired temperature and amount of power to be discharged, to determine a tomorrow's charge-target SOC and a tomorrow's discharge-target SOC (S143). Charge and discharge controller 146 creates a tomorrow's charge and discharge pattern, based on the estimated present SOC of storage battery 21, the tomorrow's charge-target SOC, the tomorrow's discharge-target SOC, and the tomorrow's time period of charge and discharge (S144).

Specifically, a difference between the tomorrow's charge-target SOC and the present SOC is calculated for determining a required amount of power to be charged by the tomorrow's discharge start time. Charge and discharge controller 146 determines a charge rate and a charge start time with which an SOC of storage battery 21 can reach the charge-target SOC by the discharge start time. To reduce a temperature rise in storage battery 21, storage battery 21 is desirably charged as much as possible at a lower charge rate in a longer time period. A charge suspension period, i.e., a period of cooling storage battery 21 may be provided during the charging.

Discharging ends upon a condition has been satisfied where either discharge end time or discharge-target SOC has been reached. When only the latter is used as a condition, battery management unit 14 is not required to create a schedule of after discharging has been started. Power-demand and temperature prediction apparatus 30 has merely to notify battery management unit 14 of an amount of power to be discharged and a discharge start time.

Charge and discharge controller 146 notifies converter controller 13 of a charge instruction or a discharge instruction, in conformity with the created charge and discharge plan (S146).

As described above, according to this exemplary embodiment, in peak shaving or peak shift using storage battery 21, setting an optimum available SOC range based on a temperature of storage battery 21 can ensure a required power supply amount [Wh] and reduce degradation in storage battery 21. In other words, by determining an available SOC range with which a total degree of storage degradation and cycle degradation in storage battery 21 becomes minimum, degradation in storage battery 21 can be delayed and a life of storage battery 21 can be extended.

The present disclosure has been described based on the exemplary embodiment. The exemplary embodiment is merely an example, and the person of ordinary skill in the art can understand that these configuration elements and these combined processing processes can be modified, and such modified examples are covered by the scope of the present disclosure.

In the above exemplary embodiment, a storage battery has been used as a possible power storage device; however, a capacitor (e.g., electric double layer capacitor) may be used. Similar to a storage battery, a capacitor is also subject to storage degradation and cycle degradation, which can also be considered similar to a storage battery.

The above exemplary embodiment has described that a charge and discharge cycle is performed daily; however, a charge and discharge cycle may be performed hourly. For example, power-demand and temperature prediction apparatus 30 predicts demand of power to be consumed, after an hour, in a load in customer 4 within another hour. When battery management unit 14 acquires discharge instruction information that is in conformity to the prediction from power-demand and temperature prediction apparatus 30, then, battery management unit 14 ends charging in an hour and, after the hour, starts discharging.

In the above exemplary embodiment, as possible temperature information to be used for determining an optimum operation point in an available SOC range, a tomorrow's predicted average air temperature supplied from power-demand and temperature prediction apparatus 30 has been used as is. In this point of view, charge and discharge controller 146 may correct the predicted average air temperature in accordance with how storage battery 21 is disposed. An air temperature to be predicted may be changed in consideration of heat generation from and heat absorption by a battery accompanied with charging and discharging. Temperature information is not limited to an average air temperature. For example, temperature information may be a maximum temperature in a day or time periods of charge and discharge, a temperature acquired by weighting and combining in a desired manner temperatures in time periods of 30 minutes or an hour, for example, subdivided from time periods of charge and discharge, or other temperatures. In addition, a correction table may be created by measuring beforehand a relationship between an outside air temperature and a temperature of power storage module 20. When a predicted air temperature in terms of time period can be acquired from power-demand and temperature prediction apparatus 30, charge and discharge controller 146 may further weight an air temperature in a time period of discharge to recalculate a tomorrow's average air temperature.

In the above exemplary embodiment, a tomorrow's amount of power to be discharged, a tomorrow's time period of discharge, and a tomorrow's predicted temperature have been acquired from power-demand and temperature prediction apparatus 30. However, a tomorrow's amount of power to be discharged, a tomorrow's time period of discharge, and a tomorrow's predicted temperature may respectively be acquired from separate apparatuses. Charge and discharge controller 146 may predict, without using a tomorrow's predicted temperature acquired externally, a tomorrow's predicted temperature based on a temperature acquired from temperature sensor 221. For example, a tomorrow's predicted temperature may be acquired by calculating a previous day's average temperature based on a time transition in temperature, which is acquired from temperature sensor 221 in the previous day. In another possible specification, a user may input a temperature.

The above exemplary embodiment has taken a temperature of storage battery 21 into consideration for determining an optimum operation point in an available SOC range. In this point of view, in addition to a temperature of storage battery 21, an operation period of storage battery 21 may be taken into consideration. Storage degradation in storage battery 21 depends on, in addition to temperature, a number of days since storage battery 21 has been used. It is known that, under a certain temperature condition, a degree of storage degradation in storage battery 21 varies in accordance with a square root law of an operation time. In other words, a degree of storage degradation increases in an initial operation phase, but decreases in a later operation phase.

Charge and discharge controller 146 raises a charge-target SOC and a discharge-target SOC as storage battery 21 has been used for a longer period of time. As a number of days increases since storage battery 21 has been used, a degree of storage degradation decreases. Although raising an available SOC range causes an increase in degree of storage degradation increases, decreasing charge and discharge current amounts leads to a decrease in degree of cycle degradation. Since an effect of decreasing a degree of cycle degradation is higher than an effect of increasing a degree of storage degradation, raising an available SOC range is effective at decreasing a total degree of degradation.

Through experiments and simulations based on the above knowledge, designers derive an operation point in an available SOC range, at which a total degree of degradation in storage battery 21 becomes minimum, for each combination of a temperature of storage battery 21, an operation period of storage battery 21, and an amount of power to be discharged from storage battery 21. A derived operation point in an available SOC range for each combination of a temperature of storage battery 21, a number of days of operation of storage battery 21, and an amount of power to be discharged from storage battery 21 is written in available SOC range determination table 147. Charge and discharge controller 146 determines an optimum operation point in an available SOC range by referring to available SOC range determination table 147, based on, as a key, a combination of a tomorrow's predicted temperature, a number of days of operation, and an amount of power to be discharged.

The above exemplary embodiment may be specified by the following items.

[Item 1]

Management apparatus (14) including controller (142) that issues an instruction of charge and discharge control to charge storage device (21) up to a first target state of charge (SOC) and to discharge power storage device (21) up to a second target SOC, in which: controller (142) lowers the first target SOC and the second target SOC with an increase in predicted temperature of power storage device (21) in a next charge and discharge cycle.

This configuration is allowed to ensure a required amount of power to be discharged and to reduce storage degradation in power storage device (21).

[Item 2]

Management apparatus (14) of item 1, in which: controller (142) lowers the first target SOC and the second target SOC such that the second target SOC is lower than the first target SOC.

This configuration is allowed to reduce a difference between an amount of power dischargeable before lowering an SOC and an amount of power dischargeable after lowering the SOC.

[Item 3]

Management apparatus (14) of item 1 or 2, in which: controller (142) determines a degree of lowering the first target SOC and a degree of lowering the second target SOC such that an amount of power to be output from power storage device (21) is constant in discharging power storage device (21) from the first target SOC to the second target SOC.

This configuration is allowed to make an amount of power dischargeable before lowering an SOC equal to an amount of power dischargeable after lowering the SOC.

[Item 4]

Management apparatus (14) of any one of items 1 to 3, in which: the controller acquires a next discharge start time, a next amount of power to be discharged, and a next predicted temperature each regarding the power storage device and determines the first target SOC and the second target SOC in accordance with the acquired amount of power to be discharged and predicted temperature each regarding the power storage device.

This configuration is allowed to determine an optimum first target SOC and an optimum second target SOC in accordance with a temperature, thereby minimizing a total degree of storage degradation and cycle degradation.

[Item 5]

Management apparatus (14) of item 4, in which: controller (142) ends charging of the power storage device up to the first target SOC, by the discharge start time.

This configuration is allowed to secure a required amount of power to be discharged from power storage device (21), by the discharge start time.

[Item 6]

Management apparatus (14) of any one of items 1 to 5, in which: during the charging of the power storage device up to the first target SOC, controller (142) suspends the charging at least once.

This configuration is allowed to reduce a temperature rise in power storage device (21) during the charging.

[Item 7]

Management apparatus (14) of any one of items 1 to 6, in which: during the discharging of the power storage device up to the second target SOC, controller (142) suspends the discharging at least once.

This configuration allows discharging according to power consumption by a load.

[Item 8]

Charge and discharge control apparatus (10) including: management apparatus (14) of any one of items 1 to 7; and converter controller (13) that controls a converter (11, 12) disposed between power storage device (21) and system line (3), in accordance with an instruction from management apparatus (14).

[Item 9]

Power storage system (1) including: power storage device (21); and charge and discharge control apparatus (10) of item 8 that controls charging to and discharging from power storage device (21).

[Item 10]

A charge and discharge control method for power storage device (21), the charge and discharge control method including: repeating charge and discharge control to charge power storage device (21) up to a predetermined first state of charge (SOC) and to discharge power storage device (21) up to a predetermined second SOC; and controlling power storage device (21) such that power storage device (21) lowers the first SOC and the second SOC with an increase in predicted temperature of power storage device (21).

This configuration is allowed to ensure a required amount of power to be discharged and to reduce storage degradation in power storage device (21).

[Item 11]

The charge and discharge control method of item 10, in which: a degree of lowering the predetermined second SOC accompanied with a temperature rise is greater than a degree of lowering the predetermined first SOC accompanied with the temperature rise.

This configuration is allowed to reduce a difference between an amount of power dischargeable before lowering an SOC and an amount of power dischargeable after lowering the SOC.

[Item 12]

The charge and discharge control method of in item 11, in which: a degree of lowering the first SOC and a degree of lowering the second SOC are determined such that an amount of power to be supplied and output from power storage device (21) is constant in discharging storage device (21) from the predetermined first SOC to the predetermined second SOC.

This configuration is allowed to ensure a required amount of power to be discharged and to reduce storage degradation in power storage device (21).

REFERENCE MARKS IN THE DRAWINGS

1: power storage system, 2: power station, 3: system line, 4: customer, 10: charge and discharge control apparatus, 11: bidirectional AC/DC converter, 12: DC/DC converter, 13: converter controller, 14: battery management unit, 141: communication unit, 142: controller, 143: monitoring data acquisition unit, 144: SOC estimation unit, 145: discharge instruction information acquisition unit, 146: charge and discharge controller, 147: available SOC range determination table, 20: power storage module, 21: storage battery, 22: monitoring unit, 221: temperature sensor, 222: voltage sensor, 223: current sensor, 30: power-demand and temperature prediction apparatus.

The invention claimed is:

1. A management apparatus comprising
a controller that issues an instruction of charge and discharge control to charge a power storage device up to a first target state of charge (SOC) and to subsequently discharge the power storage device to a second target SOC, wherein the controller lowers the first target SOC and the second target SOC with an increase in predicted temperature of the power storage device in a next charge and discharge cycle, and the controller acquires a next discharge start time, a next amount of power to be discharged, and a next predicted temperature each regarding the power storage device, and determines the first target SOC and the second target SOC in accordance with the acquired amount of power to be discharged and predicted temperature each regarding the power storage device.

2. The management apparatus according to claim 1, wherein the controller lowers the first target SOC and the second target SOC such that the second target SOC is lowered more than the first target SOC.

3. The management apparatus according to claim 1, wherein the controller determines an amount of lowering the first target SOC and an amount of lowering the second target SOC such that an amount of power to be output from the power storage device is constant in discharging the power storage device from the first target SOC to the second target SOC.

4. The management apparatus according to claim 1, wherein the controller ends charging of the power storage device up to the first target SOC, by the discharge start time.

5. The management apparatus according to claim 1, wherein during the charging of the power storage device up to the first target SOC, the controller suspends the charging at least once.

6. The management apparatus according to claim 1, wherein during the discharging of the power storage device up to the second target SOC, the controller suspends the discharging at least once.

7. A charge and discharge control apparatus comprising:

a management apparatus; and a converter controller that controls a converter disposed between the power storage device and a system line, in accordance with an instruction from the management apparatus, the management apparatus further comprising:

a controller that issues an instruction of charge and discharge control to charge a power storage device up to a first target state of charge (SOC) and to subsequently discharge the power storage device to a second target SOC, wherein the controller lowers the first target SOC and the second target SOC with an increase in predicted temperature of the power storage device in a next charge and discharge cycle.

8. A power storage system comprising:

the charge and discharge control apparatus according to claim 7 that controls charging to and discharging from the power storage device; and the power storage device.

* * * * *